Patented Dec. 12, 1933

1,939,005

UNITED STATES PATENT OFFICE 1,939,005

PRODUCTION OF ALDEHYDES

Friedrich Wilhelm Guthke, Ludwigshafen-on-the-Rhine, Germany, assignor to General Aniline Works, Inc., New York, N. Y., a corporation of Delaware No Drawing. Application November 30, 1929, Serial No. 410,886, and in Germany December 29, 1928

4 Claims. (Cl. 260—136)

The present invention relates to the production of aldehydes.

It has already been proposed to prepare aromatic aldehydes by allowing carbon monoxide to act on neutral aromatic compounds such as aromatic hydrocarbons or neutral substitution products of the same at superatmospheric pressure and in the presence of anhydrous aluminium chloride as the catalyst.

I have now found that a considerable increase in the yields obtained by this method is effected when titanium chloride is added to the catalyst consisting of anhydrous aluminium chloride or containing the same and, if desired, small quantities of other anhydrous metal halides such as iron chloride, or other chlorides of the metals occurring in ores rich in aluminium. Even a small amount such as about 1 per cent of the titanium chloride is already sufficient but also higher quantities may be employed and in some cases still lower quantities are sufficient. The process may be carried out for example with the aid of an aluminium chloride which in consequence of its preparation from special titaniferous ores contains small amounts of titanium chloride and at any superatmospheric pressure such as between about 1 and 200 atmospheres. A commercial aluminium chloride prepared for example by the chlorination of titaniferous bauxite has proved especially suitable. If desired, very small quantities of mineral acids such as concentrated sulphuric acid or hydrochloric acid may be added to the reaction mixture.

The following examples will further illustrate the nature of this invention, but the invention is not restricted to these examples. The parts are by weight.

Example 1

100 parts of aluminium chloride, 1 part of titanium chloride and 190 parts of benzene are introduced into an autoclave provided with a stirring device and carbon monoxide, is led in at from 30° to 35° centigrade until the pressure has become constant at 60 atmospheres. The yield of benzaldehyde is considerably greater than when working without the addition of titanium chloride.

Example 2

100 parts of aluminium chloride, which has been prepared from a bauxite containing from about 0.5 to 1 per cent of $Fe_2O_3$ and about from 0.4 to 0.6 per cent of $TiO_2$, and which contains from about 1 to 2 per cent of iron chloride and from about 1 to 1.5 per cent of titanium chloride, are introduced together with 280 parts of toluene into an autoclave fitted with means for stirring, and carbon monoxide is led in at from 35° to 40° centigrade until the pressure remains constant at 60 atmospheres. The yield of p-toluylaldehyde is greater than when a commercial aluminium chloride is employed which has been obtained for example from waste of metallic aluminium and which contains no titanium chloride.

Example 3

100 parts of aluminium chloride, 1 part of titanium chloride and 275 parts of chlorobenzene are treated with carbon monoxide at 60° centigrade as described in Examples 1 and 2 until the pressure becomes constant at 50 atmospheres. A good yield of p-chlorbenzaldehyde is obtained.

What I claim is:—

1. In the production of aldehydes by contacting a compound selected from the group consisting of the aromatic hydrocarbons of the benzene series and their halogen derivatives with carbon monoxide at a pressure of at least 1 atmosphere in excess of atmospheric pressure, the step which comprises carrying out the operation in the presence of a catalyst comprising essentially anhydrous aluminium chloride and a small quantity of titanium chloride.

2. In the production of aldehydes by contacting a compound selected from the group consisting of the aromatic hydrocarbons of the benzene series and their halogen derivatives with carbon monoxide at a pressure of at least 1 atmosphere in excess of atmospheric pressure, the step which comprises carrying out the operation in the presence of a catalyst comprising essentially anhydrous aluminium chloride and about 1 per cent by weight thereof of titanium chloride.

3. In the production of aldehydes by contacting an aromatic hydrocarbon of the benzene series with carbon monoxide at a pressure of at least 1 atmosphere in excess of atmospheric pressure, the step which comprises carrying out the operation in the presence of a catalyst comprising essentially anhydrous aluminium chloride and about 1 per cent by weight thereof of titanium chloride.

4. In the production of aldehydes by contacting benzene with carbon monoxide at a pressure of at least 1 atmosphere in excess of atmospheric pressure, the step which comprises carrying out the operation in the presence of a catalyst comprising essentially anhydrous aluminium chloride and about 1 per cent by weight thereof of titanium chloride.

FRIEDRICH WILHELM GUTHKE.